United States Patent [19]
Smith

[11] 3,902,002
[45] Aug. 26, 1975

[54] GROUNDING ATTACHMENT FOR NON-METALLIC ENCLOSURES

[75] Inventor: James I. Smith, Bristol, Conn.

[73] Assignee: General Electric Company, New York, N.Y.

[22] Filed: Feb. 13, 1974

[21] Appl. No.: 441,959

[52] U.S. Cl. ................................ 174/51; 174/65 R
[51] Int. Cl.² .......................................... H02G 3/08
[58] Field of Search ......... 174/51, 65 R, 78, DIG. 3; 339/14 R, 14 L; 29/630 G; 40/152, 156

[56] References Cited
UNITED STATES PATENTS

| | | | |
|---|---|---|---|
| 2,125,747 | 8/1938 | Zadek | 40/156 X |
| 2,241,263 | 5/1941 | Koppe | 40/152 X |
| 3,176,191 | 3/1965 | Rowe | 29/630 G |
| 3,411,226 | 11/1968 | Ericsson | 40/156 X |
| 3,415,942 | 12/1968 | Knoy | 174/51 |
| 3,634,598 | 1/1972 | Stanfield | 174/51 |

FOREIGN PATENTS OR APPLICATIONS

| | | | |
|---|---|---|---|
| 1,528,075 | 4/1968 | France | 174/DIG. 3 |

Primary Examiner—J. V. Truhe
Assistant Examiner—David A. Tone
Attorney, Agent, or Firm—Robert A. Cahill; Walter C. Bernkopf; Frank L. Neuhauser

[57] ABSTRACT

Grounding provision for a non-metallic electrical equipment enclosure includes a perimetrical electrically conductive metallic frame externally fitted to the enclosure adjacent the junctions of the enclosure sidewalls and backwall. Projections extend from the frame partially over knockouts formed in the enclosure walls. Removal of the knockouts to create openings in the enclosure exposes the projection free ends for electrical connection to electrical conduit admitted therethrough.

4 Claims, 4 Drawing Figures

PATENTED AUG 26 1975 3,902,002
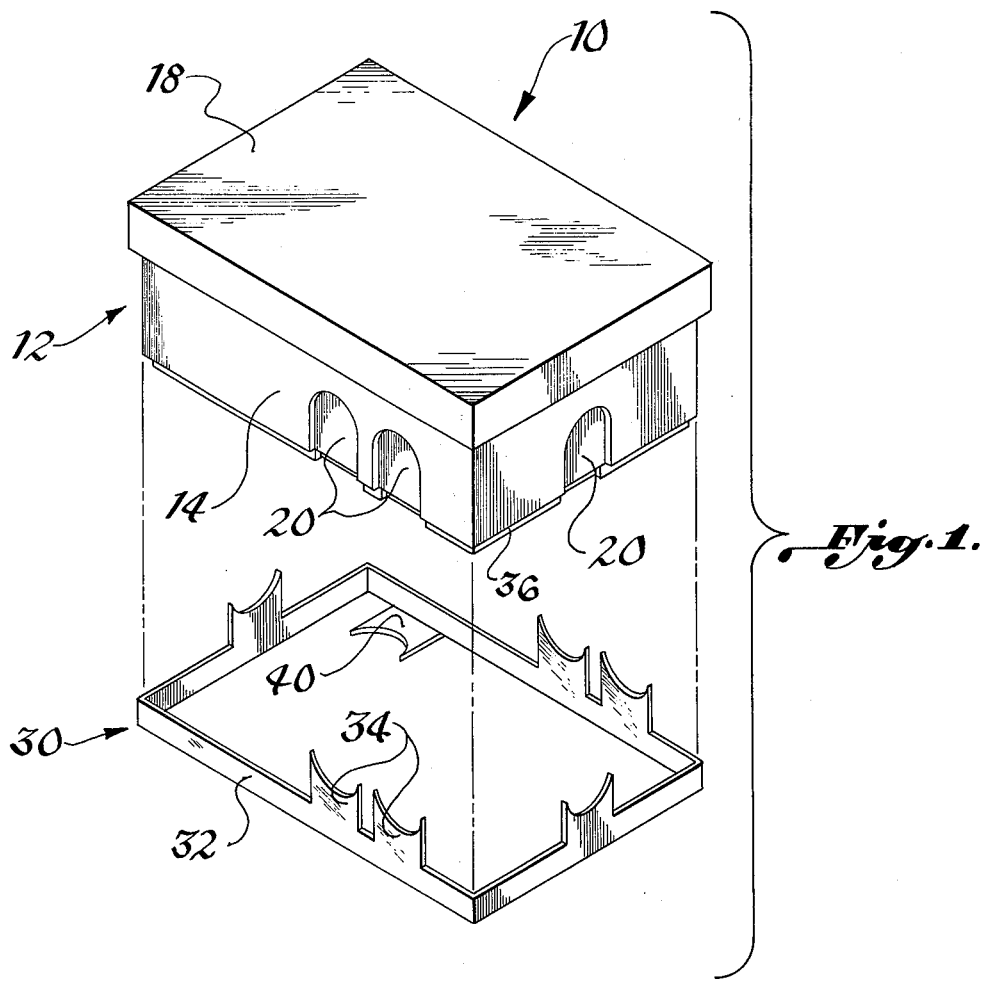
Fig. 1.
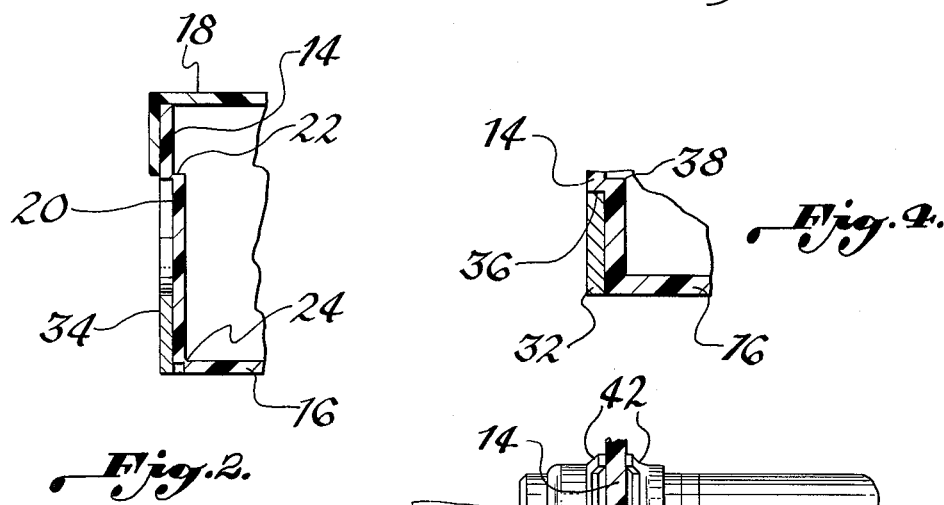
Fig. 2.
Fig. 4.
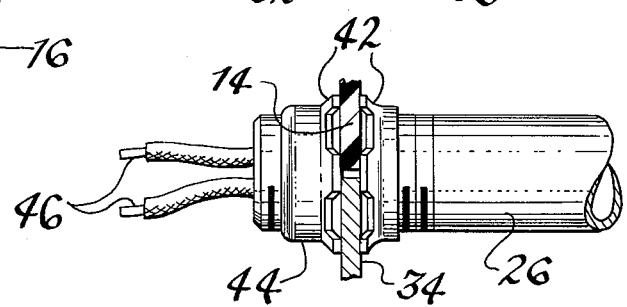
Fig. 3.

GROUNDING ATTACHMENT FOR NON-METALLIC ENCLOSURES

BACKGROUND OF THE INVENTION

The use of non-metallic electrical equipment enclosures has heretofore been limited to those installations where non-metallic sheathed cable is used. This cable includes a separate equipment ground conductor which is admitted into the non-metallic enclosure together with the load current carrying conductors for connection with other equipment ground conductors to a common equipment ground bus. In this way ground circuit continuity is provided for the various load circuits serviced by the equipment within the enclosure.

In installations using metal sheathed cable or conduit, non-metallic enclosures can not be used since no equipment ground conductor is typically present for connection to a common equipment ground bus. Instead the metal sheath or conduit, being electrically conductive, is advantageously utilized in the ground circuit. Completion of the ground circuit relies on the use of a conductive, metallic enclosure, to which the conductive sheaths or conduits are commonly, electrically connected and physically clamped at their points of entry into the enclosure.

One proposal, disclosed in U.S. Pat. No. 3,415,942, for making a non-metallic enclosure compatible for use with metallic sheated cable or conduit resides in providing a conductive metal inlay lining the interior backwall and sidewalls of the non-conductive enclosure. The inlay is provided with apertures aligned with the openings in the enclosure admitting the conduit, and electrical continuity therebetween is provided by a nut clamping the conduit in place.

It is an object of the present invention to provide a ground circuit continuity attachment for adapting non-metallic electrical equipment enclosures for implementation in wiring installations using metallic sheathed cable or conduit.

Another object of the present invention is to provide a ground circuit continuity attachment of the above character which is efficient in design and operation, inexpensive to manufacture and convenient to use.

Yet another object is to provide a ground circuit continuity attachment of the above character which is capable of convenient assembly to and disassembly from non-metallic enclosures, depending on whether the installation calls for metallic or non-metallic sheathed cable.

Other objects of the invention will in part be obvious and in part appear hereinafter.

SUMMARY OF THE INVENTION

In accordance with the present invention, there is provided a non-metallic electrical equipment enclosure adapted for use with metallic sheathed cable or conduit. More specifically, the present invention provides a ground circuit continuity attachment readily adaptable to non-metallic electrical equipment enclosures for completing the ground circuit as between the electrically conductive sheaths of plural electrical cable introduced into the enclosure. In its preferred form, the ground circuit continuity attachment includes a perimetrical electrically conductive metal frame fitted externally about a non-metallic enclosure adjacent the junctions between the sidewalls and backwall thereof. Projections extend from the frame over portions of the sidewalls and backwall which are preformed to provide conveniently removable knockouts. During installation selective knockouts are removed to create openings admitting therethrough metallic sheathed cable or conduit pursuant to wiring the electrical equipment within the enclosure. The free ends of the projections extend partially across these created openings to facilitate electrical connection to the exterior of the cable or conduit admitted therethrough. To assure adequate ground circuit continuity therebetween, as well as to mechanically secure the sheath or conduit in the enclosure openings, conductive clamping means are provided to engage both the conductive sheath or conduit and the projections incident to physically securing the admitted cable to the enclosure.

The invention accordingly comprises the features of construction and arrangement of parts which will be exemplified in the construction hereinafter set forth, and the scope of the invention will be indicated in the claims.

DESCRIPTION OF THE DRAWING

For a fuller understanding of the nature and objects of the invention, reference should be had to the following detailed description taken in connection with the accompanying drawing in which:

FIG. 1. is an exploded perspective view of a non-metallic electrical equipment enclosure and ground circuit continuity attachment constructed according to a preferred embodiment of the invention and shown in disassembly.

FIG. 2 is a transverse sectional view taken through one of the enclosure sidewall knockouts with the ground circuit continuity attachment of FIG. 1 in place;

FIG. 3 is a transverse sectional view similar to FIG. 2 with a metallic sheathed conduit secured in a sidewall opening created by removal of a knockout; and FIG. 4 is a fragmentary sectional view with ground circuit continuity attachment in place, taken through a sidewall-backwall junction at a location beyond a sidewall knockout.

Like reference numerals refer to corresponding parts throughout the several views of the drawing.

DETAILED DESCRIPTION

In the form of the invention seen in FIG. 1, a non-metallic molded enclosure, generally indicated at 10, comprises a box-like housing 12 having four sidewalls 14 and backwall 16 (FIG. 2). A separate cover 18 fitted over the open front of the housing 12 completes the enclosure 10 for such electrical equipment as, for example, electrical switches, circuit breakers, receptacles, and the like. The housing sidewalls 14 are molded with upstanding, arch-sahped wall sections which are inwardly offset from planes of the respective sidewalls to provide readily removable knockouts 20, as best seen in FIG. 2. These knockouts are joined along their sides and tops to the sidewalls by a relatively frangible seam 22 and joined along their bottoms to the backwall by a similar seam 24 of reduced material thickness to facilitate knockout removal, thereby providing openings into the enclosure admitting a metallic sheathed cable or conduit 26 (FIG. 3). For convenient wiring installation the knockouts 20 are formed at various locations distributed around the sides of the enclosure, as illustrated in FIG. 1, and, although not specifically illustrated, may also be formed in the backwall 16.

To adapt the non-metallic enclosure 10 for use in wiring installations utilizing metallic sheathed cable or conduit, a ground circuit continuity attachment, generally indicated at 30 in FIG. 1, is fitted about the back of the enclosure at the junctions of the sidewalls 14 and backwall 16. The attachment 30 is formed of an electrically conductive metal frame 32, rectangular in configuration, for perimetrical adaptation to enclosure 10. At locations around frame 32 corresponding to the locations of the sidewall knockouts 20, integral projections 34 extend upwardly into the arch-shaped recesses created by the setback of the sidewall knockouts. The free ends of these projections are formed with semicircular termination such that, upon removal of the knockout, the projection termination cooperates with the adjacent sidewall to define a circular opening into the enclosure. The diameter of the opening is somewhat in excess of the diameter of the conduit 26 to be admitted.

Intermediate the sidewall knockouts 20, the exterior corners are notched, as indicated at 36 in FIG. 4, to provide elongated seats accommodating the sections of frame 32 intermediate projections 34. Preferably, interior fillets 38 are provided to strengthen the corners of the enclosure at the sidewall-backwall junctions intermediate the sidewall knockouts.

If the enclosure backwall 16 is provided with knockouts (not shown), the frame 32 carries appropriately located inwardly extending projections, one shown at 40 in FIG. 1, to provide a conductive free end portion in contiguous relation to the opening created by the removal thereof.

Upon removal of a sidewall knockout 20, the electrical conduit 26, as seen in FIG. 3, can be introduced into the enclosure 10 through the created circular opening defined by the free end of a projection 34 and the sidewall surrounding the upper portion of the arch-shaped knockout. The end of conduit is preferably threaded to receive a pair of opposed jam nuts 42 clamping therebetween the upper portion of projection 34 and the sidewall. The projection is made of approximately the same guage as the sidewall 14 surrounding the knockout to insure positive clamping engagement with both the sidewall and the projection, and good electrical contact between the jam nuts and the projection. A bushing 44 is preferably threaded in the free end of the conduit to protect the electrical conductors 46 emanating therefrom.

It will be appreciated that flexible metallic sheathed cable rather than conduit 26 could also be accomodated by the invention, using different forms of clamping elements. All that is required is that the clamping elements perform the requisite mounting function while providing good electrical continuity between the metallic sheaths and the projections 34. While frame 30 is illustrated as being rectangular, it would be appreciated that the objects of the invention can be accomplished using a frame configured for less than complete perimetrical adoption to a non-metallic enclosure.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An enclosure for electrical equipment, said enclosure comprising, in combination:
    A. an integral box-like housing formed of non-metallic material having sidewalls, a backwall, and an open front;
    B. a cover on said housing closing off said open front thereof;
    C. knockouts formed in at least one of said housing walls, said knockouts being removable to provide openings in said wall admitting metallic sheated electrical conductors; and
    D. electrically conductive grounding means including
        1. a unitary frame fitted to said housing adjacent the junction of said sidewalls and backwall, and
        2. projections extending from said frame partially over each of said knockouts,
        3. whereby upon removal of selected knockouts, the free ends of said projections thereat are exposed in the created wall openings for electrical connection with the metallic sheaths of the conductors when admitted therethrough.

2. The enclosure defined in claim 1, wherein said knockouts are archshaped and the free ends of said projections are arcuate, whereby, upon removal of said knockouts, each projection free end cooperates with the adjacent sidewall to define a circular opening into the enclosure interior.

3. The enclosure defined in claim 1, which further includes knockouts formed in said sidewalls and backwall.

4. The enclosure defined in claim 1, wherein said frame is perimetrical in configuration and the junctions of said sidewalls and backwall are recessed to accommodate said frame.

* * * * *